United States Patent [19]

Talonen et al.

[11] Patent Number: 4,937,057
[45] Date of Patent: Jun. 26, 1990

[54] METHOD FOR REMOVING SULPHUR IN ELEMENTAL FORM FROM GASES CONTAINING SULPHUR DIOXIDE OR SULPHUR DIOXIDE AND HYDROGEN SULPHIDE

[75] Inventors: Timo T. Talonen, Nakkila; Jaakko T. I. Poijärvi, Ulvila, both of Finland

[73] Assignee: Outokumpu Oy, Helsinki, Finland

[21] Appl. No.: 256,120

[22] Filed: Oct. 11, 1988

Related U.S. Application Data

[63] Continuation of Ser. No. 928,629, Nov. 5, 1986, abandoned, which is a continuation of Ser. No. 730,455, May 6, 1985, abandoned.

[30] Foreign Application Priority Data

Jun. 27, 1984 [FI] Finland .................................. 842578

[51] Int. Cl.$^5$ ...................... C01B 17/05; C01B 17/16
[52] U.S. Cl. ................................... 423/220; 423/242; 423/577
[58] Field of Search ............... 423/220, 242, 222, 571, 423/567 R, 577, 574

[56] References Cited

U.S. PATENT DOCUMENTS

| | | | |
|---|---|---|---|
| 2,209,331 | 7/1940 | Haglund | 423/577 |
| 2,863,732 | 12/1958 | Bowers et al. | 423/577 |
| 3,529,957 | 9/1970 | Kunda et al. | 423/577 |
| 3,784,680 | 1/1974 | Strong et al. | 423/577 |
| 4,083,944 | 4/1978 | Chalmers | 423/571 |
| 4,418,014 | 11/1983 | Daniek | 423/577 |
| 4,444,736 | 4/1984 | Shapiro | 423/571 |

FOREIGN PATENT DOCUMENTS 0913889 6/1954 Fed. Rep. of Germany ... 423/244 A

Primary Examiner—Anthony McFarlane
Attorney, Agent, or Firm—Brooks, Haidt, Haffner & Delahunty

[57] ABSTRACT

The present invention relates to a method for removing sulphur dioxide and possible hydrogen sulphide as well as nitric oxides from exhaust gases by means of sulphides in a liquid phase so that the sulphur is recovered in the form of molten elemental sulphur. The soluble sulphates formed in the scrubbing are regenerated after a known fashion by means of sulphides or by reducing back into sulphides and are conducted back into the sulphur dioxide absorption stage.

4 Claims, 8 Drawing Sheets

METHOD FOR REMOVING SULPHUR IN ELEMENTAL FORM FROM GASES CONTAINING SULPHUR DIOXIDE OR SULPHUR DIOXIDE AND HYDROGEN SULPHIDE

This application is a continuation of application Ser. No. 06/928,629, filed Nov. 5, 1986, now abandoned which is a continuation of U.S. Ser. No. 06/730,455 filed May 6, 1985, now abandoned.

BACKGROUND OF THE INVENTION

1. Field of the Invention

The present invention relates to a method for removing sulphur dioxide and possible hydrogen sulphide as well as nitric oxides from exhaust gases by means of sulphides in a liquid phase so that the sulphur is recovered in the form of molten elemental sulphur. The soluble sulphates created in the scrubbing are regenerated in a known fashion either by means of sulphides back into sulphides or by means of reduction, and are subsequently conducted back into the sulphur dioxide absorption stage.

2. Description of the Prior Art

The sulphur dioxide contained in exhaust gases can be removed in various different ways. So far the most popular method has been to neutralize $SO_2$ with lime, limestone, magnesite, etc. The created sulphate/sulphite is a thixotropic waste which is only slightly soluble and difficult to treat. New methods for recovering $SO_2$ are continuously being developed; one of the current trends has been to remove $SO_2$ from exhaust gases by means of various sulphides.

The German Patent No. 913 889 discloses a method where the sulphur dioxide contained in exhaust gases is absorbed into a $Na_2S$-bearing solution. The molar ratio of sulphur dioxide is threefold compared to the mole quantity of sodium sulphide, and the purpose of the whole process is that all of the $SO_2$ contents are associated into tetrathionate. The recovery of sulphur from tetrathionate is carried out by heating the solution in an open vessel. A quarter of the sulphur contained in the tetrathionate is released as sulphur dioxide and conducted into the hood above the heating vessel, and subsequently into the sulphur dioxide absorption stage. Two quarters of the sulphur contained in the tetrathionate are recovered in the form of elemental sulphur, and one quarter remains in sodium sulphate. The created sodium sulphate is regenerated by means of barium sulphide back into sodium sulphide and returned to the $SO_2$ absorption stage. The created barium sulphate is reduced into barium sulphide by means of carbon. The sulphur generated during the process of breaking down tetrathionate is finely divided and is passed on for further cleaning.

Sherritt Gordon Mines has developed a method in which elemental sulphur and ferrosulphate are produced by dissolving the sulphur dioxide contained in exhaust gases into a suspension of pyrrhotite in water. This process is described in the German Patent Application No. 2 118 513 and in the Canadian Metallurgical Quarterly, Vol. 9, No. 4, p. 551–561. In the said method, both the sulphur dioxide and the pyrrhotite in aqueous suspension are conducted into an autoclave, where they are reacted into ferrosulphate and elemental sulphur according to their molar ratios. The temperature in the autoclave is between 65°–121° C., and the $SO_2$ partial pressure is at least 1.05 kg/cm². From the autoclave there is recovered solid elemental sulphur and nonreacted pyrrhotite as well as iron sulphate solution which can be utilized in the production of iron. In order to accelerate the reactions between pyrrhotite and sulphur dioxide and thus to increase the quantity of elemental sulphur, some carbon can be added into the autoclave.

As for the practical performance, the Sherritt Gordon process still has some difficulties: in the method $SO_2$, and consequently the $SO_2$-laden gas likewise, are conducted directly into the autoclave. The process description does not mention anything about concentrating the $SO_2$-laden gases. If exhaust gases with a $SO_2$ content between 0.05–10% are conveyed directly into an autoclave, this sets considerable requirements for the size of the autoclave. In the said publication it is, however, mentioned that $SO_2$ is conducted into the autoclave in gaseous form. Thus it is not for example concentrated in a scrubbing solution in the scrubbers located before the autoclave.

The U.S. Pat. No. 4,078,048 describes the removal of sulphur dioxide from exhaust gases by means of an alkali metal compound, such as hydroxide. The exhaust gases are scrubbed in an aqueous solution of an alkali metal compound, which process generates for instance sodium sulphate/sulphite. The pH in the scrubbing stage is alkaline and fluctuates between 10–14, and the temperature varies between 50°–60° C. Thereafter, the sulphate/sulphite is regenerated by means of barium sulphide, so that in addition to barium sulphate precipitate, sodium sulphide is also created.

The created sodium sulphide is oxidized in the presence of air and a suitable catalyst in order to create elemental sulphur. The formed sulphur is flotated at the surface of the oxidation tank. The alkaline metal compound created in the oxidation is led back into the exhaust gas scrubbing. The $BaSO_4$ created in the regeneration is reduced into barium sulphide by means of carbon.

There is also a known process where $SO_2$-bearing gases are scrubbed with ferrosulphide (FeS). This method is described in the German Patent Application No. 2836466 and in the publication Energy Technology Processes of the Energy Technology Conference, Decade of Progress, February 1983; 10(1983), p. 925–934. This method is called the Sulf-x process. In the said method the $SO_2$-bearing gases are scrubbed in a wet scrubber, where an aqueous suspension of finely divided ferrosulphide (FeS) is employed for absorbing $SO_2$ from the gases. The solution obtained from the scrubber contains sodium sulphate, ferrosulphate and solids. The solids are separated from the solution. Part of the solution is conveyed into crystallization in order to remove the sulphates, and the rest is returned into scrubbing. The mother liquor received from the crystallization is also returned to scrubbing. The sulphate crystals and the solids separated from the scrubbing solution are combined and led into a reducing thermal treatment. The high-sulphur iron sulphide created in the scrubbing is broken down and the released sulphur is evaporated. The sulphur is recovered by means of condensing. The sodium sulphur contained in the solids is reduced into sodium sulphide. From the thermal treatment the solids are transferred back into the scrubbing solution, so that the sodium sulphide precipitates ferrosulphide out of the ferrosulphate and is itself reacted into sulphate.

It is preferable that the dissolving stage is carried out in such conditions (temperature 50°–70° C., pH 5.5 to 7.5) that the forming of iron oxide ($Fe_2O_3$) and elemental sulphur is prevented, and only ferrosulphate and high-sulphur iron sulphide (FeS$_2$) are created. The elemental sulphur is not formed until the reducing thermal treatment, where the temperature is about 760° C. and the elemental sulphur is evaporated and is recovered by means of condensing.

In the method according to the U.S. Pat. No. 4,083,944, the SO$_2$-laden gas is absorbed into a buffer solution, which is for example a citrate solution. The absorption takes place in an absorption tower, and over 80% of the sulphur dioxide of the gases is absorbed into the citrate solution. The pH of the absorber solution is adjusted within the range of 4.0 to 4.5 in order to achieve an optimal result. After the SO$_2$ absorption, sulphide ions are led into the solution at the regeneration stage, which sulphide ions are either in the form of gaseous H$_2$S or NaHS, so that the sulphide ion precipitates the elemental sulphur. The first stage for recovering the elemental sulphur is flotation. The solution obtained from this stage is conducted back into the SO$_2$ absorption tower. The elemental sulphur obtained by means of flotation, which sulphur contains impurities and the rest of the absorber solution, is treated in an autoclave whre several layers are formed; the pure, molten sulphur forms the lowest layer, the impurities are located in the middle layer and the citrate solution is in the topmost layer. This citrate solution is also conducted into recirculation. If H$_2$S is utilized in the regeneration, it is made of the elemental sulphur created in the process; if NaHS is utilized, it is made by recycling part of the SO$_2$-bearing citrate solution into the reactor where concentrated CaS solution is added. CaS increases the pH value of the solution and simultaneously the NaHSO$_3$ contained in the solution reacts with calcium sulphide so that NaHS and CaSO$_3$ are created. The calcium sulphite is insoluble, and it is filtered from the NaHS-bearing citrate solution. The calcium sulphite is regenerated into sulphide for instance by reducing with carbon.

SUMMARY OF THE INVENTION

The new method developed in the present invention aims at removing sulphur dioxide and possible hydrogen sulphide as well as nitric oxides from exhaust gases by means of sulphides in a liquid phase so that the sulphur is recovered in the form of molten elemental sulphur and the created sulphates are regenerated into sulphides.

BRIEF DESCRIPTION OF THE DRAWING

The invention is further described below with reference to the appended drawings, where.

Figure 1:
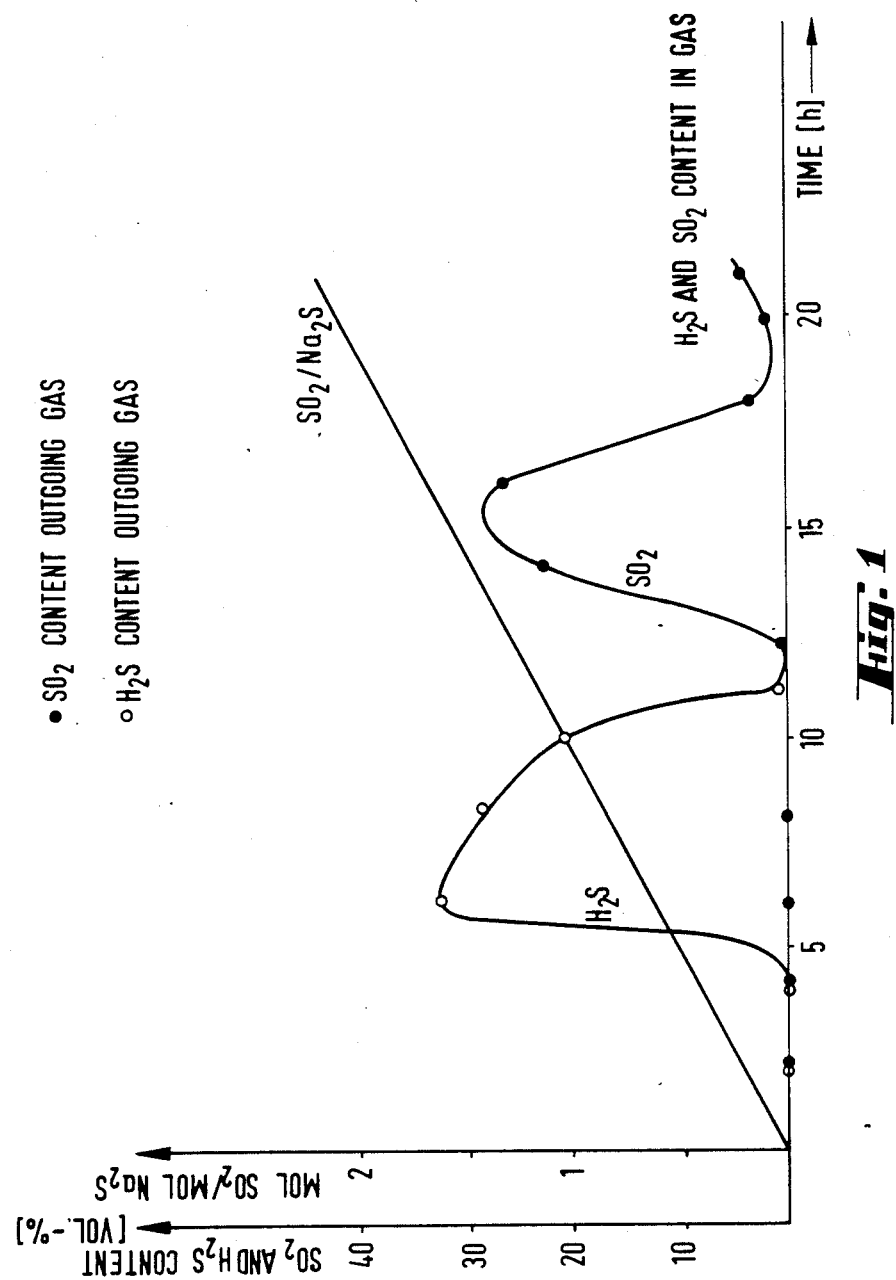
FIG. 1 illustrates the sulphur dioxide and hydrogen sulphide contents of the gas coming out of the sodium sulphate solution, as well as the molar ratio of the sulphur dioxide/sodium sulphide fed into the scrubbing solution, these presented as a function of time in the case where sulphur dioxide is led into the said solution.

The drawings are explained in more detail in the specification below.

The method of the present invention is based on the reaction between sulphur dioxide and sulphide in an aqueous phase. If sulphur dioxide is reacted with a solution containing a sulphide, the reaction corresponding to the thermodynamic balance is $$S^{--} + 2SO_2 = SO_4^{--} + 2S^o \quad (1)$$

If the sulphide-sulphur dioxide system would react to its thermodynamic balance, according to the reaction (1) the sulphur dioxide could be reduced into elemental sulphur simultaneously as the sulphide is oxidized into sulphate. Owing to kinetic inertia, the reaction (1) takes place only to a small extent. Instead of it, several side reactions take place producing various sulphur compounds. Such reactions include for instance the following:

$$S^{--} + SO_2 + H_2O = HS^- + HSO_3^- \quad (2)$$

$$2S^{--} + 3SO_2 = 2S_2O_3^{--} + S^o \quad (3)$$

$$S^o + SO_3^{--} = S_2O_3^{--} \quad (4)$$

$$S^{--} + 3SO_2 = S_4O_6^{--} \quad (5)$$

$$S_2O_3^{--} + nSO_2 = S_2O_3 \cdot nSO_2^{--} \quad (6)$$

Accordingly, as a result of the said side reactions there is formed hydrosulphide, hydrosulphite, thiosulphate and tetrathionate. In addition to these, other polythionates may also appear.

Depending on the particular metal sulphide, the relative proportions between the said reactions will vary. When low-solubility sulphides such as zinc sulphide, ferrosulphide or manganese sulphide are reacted, there is created a larger amount of sulphate and elemental sulphur than with high-solubility sulphides such as sodium sulphide, potassium sulphides, calcium sulphide or barium sulphide. However, with all the sulphide the porportion of harmful side reactions is great, and only part of the sulphur dioxide reacts into elemental sulphur according to the equation (1).

DESCRIPTION OF PREFERRED EMBODIMENTS

While sulphide solution is employed for removing the sulphur dioxide contained in the gas, it is important that the sulphur dioxide contained in the gas reacts as completely as possible. Among the low-solubility sulphides, for instance manganese sulphide and iron sulphide fulfill this condition well enough, because with them the sulphide concentration is sufficient. On the other hand, while employing zinc sulphide the sulphur dioxide reaction level is lower.

Figure 2:
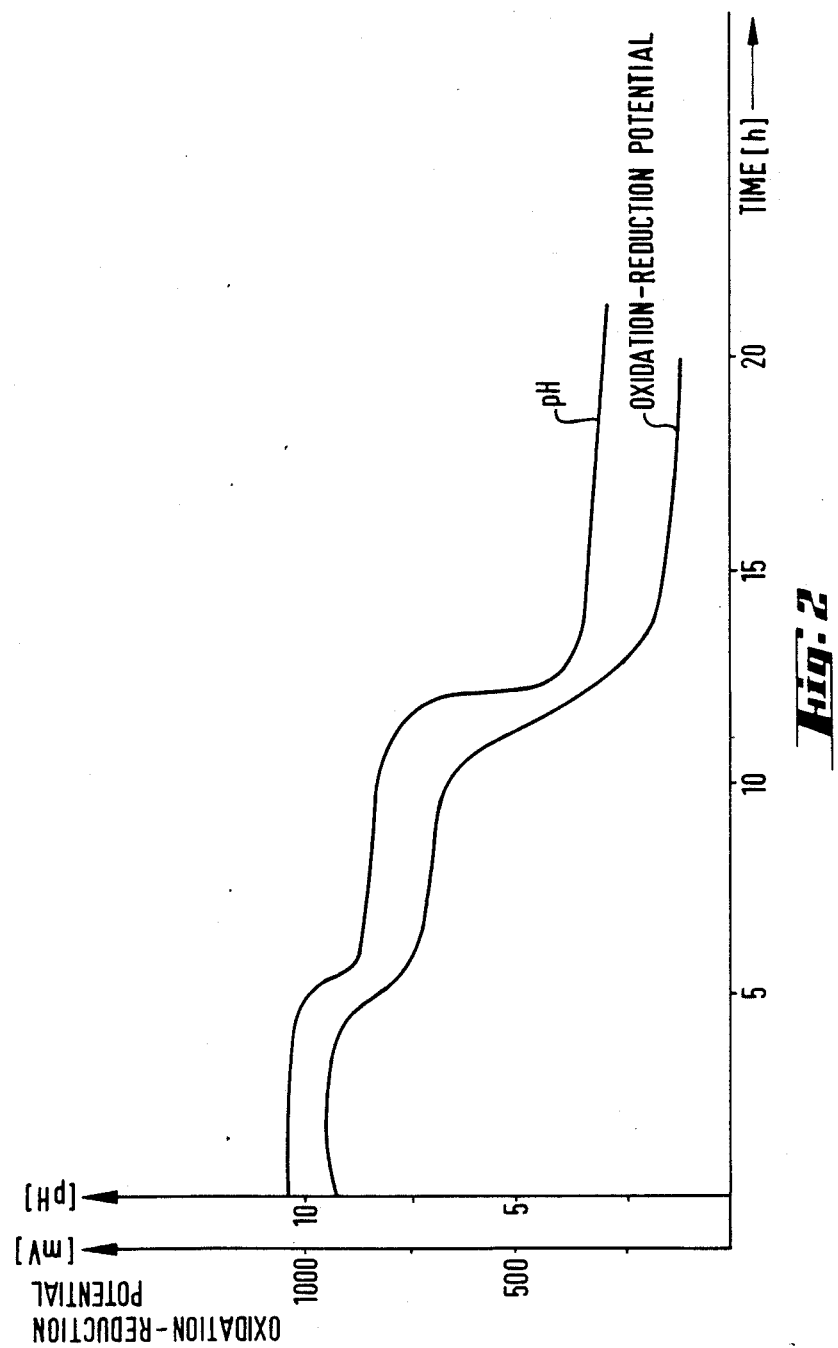
FIG. 2 illustrates the solution pH and oxidation-reduction potential, respectively as a function of time.

When sulphur dioxide is introduced into an aqueous solution of sodium sulphide, at first the sulphur dioxide reacts perfectly—apparently in accordance with the reaction equation (2). At the same time the pH value of the solution remains above 10. When about half a mole of sulphur dioxide per each one mole of sodium sulphide is absorbed, the pH value rapidly decreases roughly down to 8–9, and simultaneously plenty of hydrogen sulphide is released from the solution. The formation of hydrogen sulphide is continued until about one mole of sulphur dioxide per each mole of sodium sulphide is absorbed. Thereafter the formation of hydrogen sulphide ceases and the pH value rapidly decreases roughly down to 2.5 to 3.5. For a short while the sulphur dioxide is absorbed almost completely, and the formation of hydrogen sulphide is not remarkable. Thereafter part of the sulphur dioxide begins to pass through without absorption, but later the absorption rate is again improved. The results of the experiment are illustrated schematically in FIGS. 2 and 3.

Figure 3:
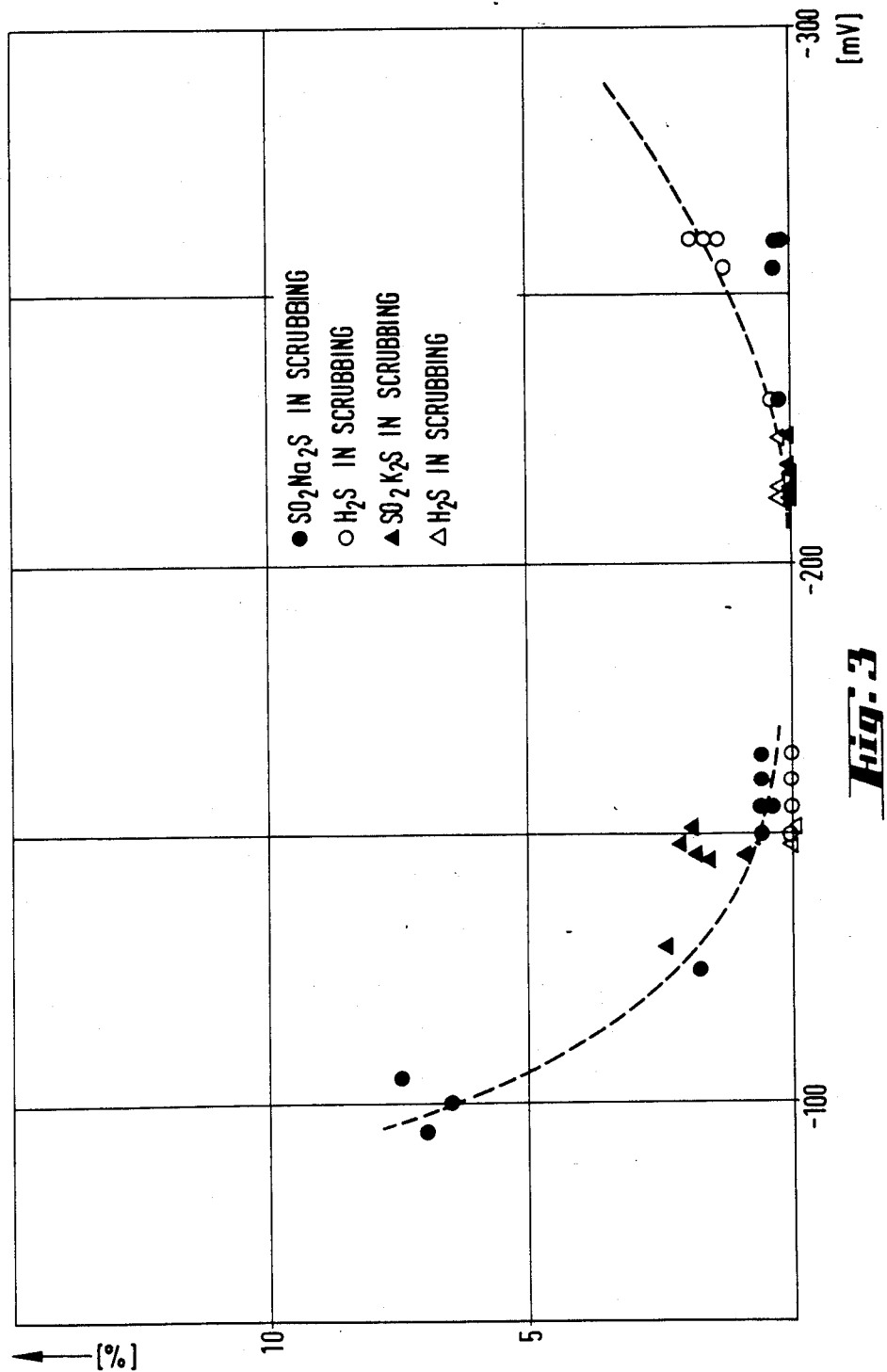
FIG. 3 illustrates the quantity of sulphur dioxide and hydrogen sulphide contained in the outgoing gas as a function of the oxidation-reduction potential.

In laboratory experiments it has been observed that in a continuous experiment where sulphur dioxide is conducted into a bubbler and where the pH value or the oxidation-reduction potential of the sulphide solution is adjusted by continuously feeding fresh sodium sulphide solution into the scrubbing solution and by discharging the spent scrubbing solution as an overflow so that the pH value remains between 2.5 to 5 or that the oxidation-reduction potential remains between $-70$—$-260$ mV, measured between a standard calomel electrode and a platinum electrode, the sulphur dioxide absorption is very near to complete and the amount of simultaneously released hydrogen sulphide is slight. If the sodium sulphide feed flow is increased with respect to the sulphur dioxide so that the pH value rises or the oxidation-reduction potential goes down, both the formation of hydrogen sulphide and the absorption of sulphur dioxide are increased. Respectively, if the sulphide feed flow is diminished with respect to the sulphur dioxide flow so that the pH value goes down, both the formation of hydrogen sulphide and the absorption of sulphur dioxide are decreased. Still, sulphur dioxide is absorbed in the solution even below the pH value 2.5. The results of the experiment are presented in example 1. FIG. 3 illustrates the absorption results of sodium and potassium sulphide scrubbing experiments in coordinates where the sulphur dioxide and hydrogen contents (%) of the outgoing gases are presented on the vertical axis, and the oxidation-reduction potential (mV) of the solution is presented on the horizontal axis. The sulphur dioxide content of the ingoing gases was between 19–20%.

In another experiment, a gas containing sulphur dioxide and hydrogen sulphide was led into a sulphide solution. The sulphide feed flow was adjusted in a similar fashion as in the previous experiment. Now both the sulphur dioxide and hydrogen sulphide were almost completely absorbed.

Analogical experiments have also been carried out with other sulphides, such as manganese sulphide, calcium sulphide, barium sulphide and potassium sulphide. The results are similar as in the case of sodium sulphide. The results of these experiments are described in examples 2, 3, 4 and 5.

When a sulphur dioxide-bearing gas is scrubbed with a sulphide solution, the elemental sulphur recovery rate according to reaction (1) is low, even extremely low while employing certain high-solubility sulphides.

Our laboratory experiments prove that the reaction (1) can be made to proceed to the end by absorbing sulphur dioxide into a sulphide solution and thereafter by depositing the solution in a closed autoclave at a higher temperature. Furthermore, the experiments show that sulphur dioxide must be absorbed into the sulphide roughly in the stoichiometric ratio indicated by the reaction (1).

If the amount of absorbed sulphur dioxide is less than the said stoichiometric ratio requires, the resulting products coresponding to the reaction (1) are formed only to a small extent and plenty of the products resulting from the side reactions, above all thiosulphate, are left in the solution.

In another experiment, only aqueous solution of sodium thiosulphate was disposed in the autoclave and the temperature was raised up to 200° C. for the duration of three hours. Only 7% of the thiosulphate was broken down in the experiment.

The experimental results also clearly show that any extra amount of sulphur dioxide which is absorbed into the sulphide solution in addition to the stoichiometric quantity indicated in the reaction (1) will react into sulphuric acid in the autoclave.

The above described observations have been utilized in the method of the present invention in order to clean gases containing sulphur dioxide or sulphur dioxide and hydrogen sulphide. The method comprises the following process stages.

Gases containing sulphur dioxide or sulphur dioxide and hydrogen sulphide are contacted with a scrubbing solution or with a scrubbing solution and solids in suspension in order to scrub the said gases. Into the solution or into the suspension there is fed fresh sulphide either as solution, as solids or as suspension. The scrubbing capacity of the solution or the suspension is adjusted by means of the said sulphide supply.

The adjusting of the sulphide feed flow is controlled according to the pH value and/or the oxidation-reduction potential value measured from the solution so that the pH value remains between 2.5 to 5 or the oxidation-reduction potential remains between $-70$—$-260$ mV. The purpose of the adjusting is to control the molar ratio between the absorbed sulphur dioxide and sulphide so that it conforms to the stoichiometric value indicated by the reaction (1).

Figure 4:
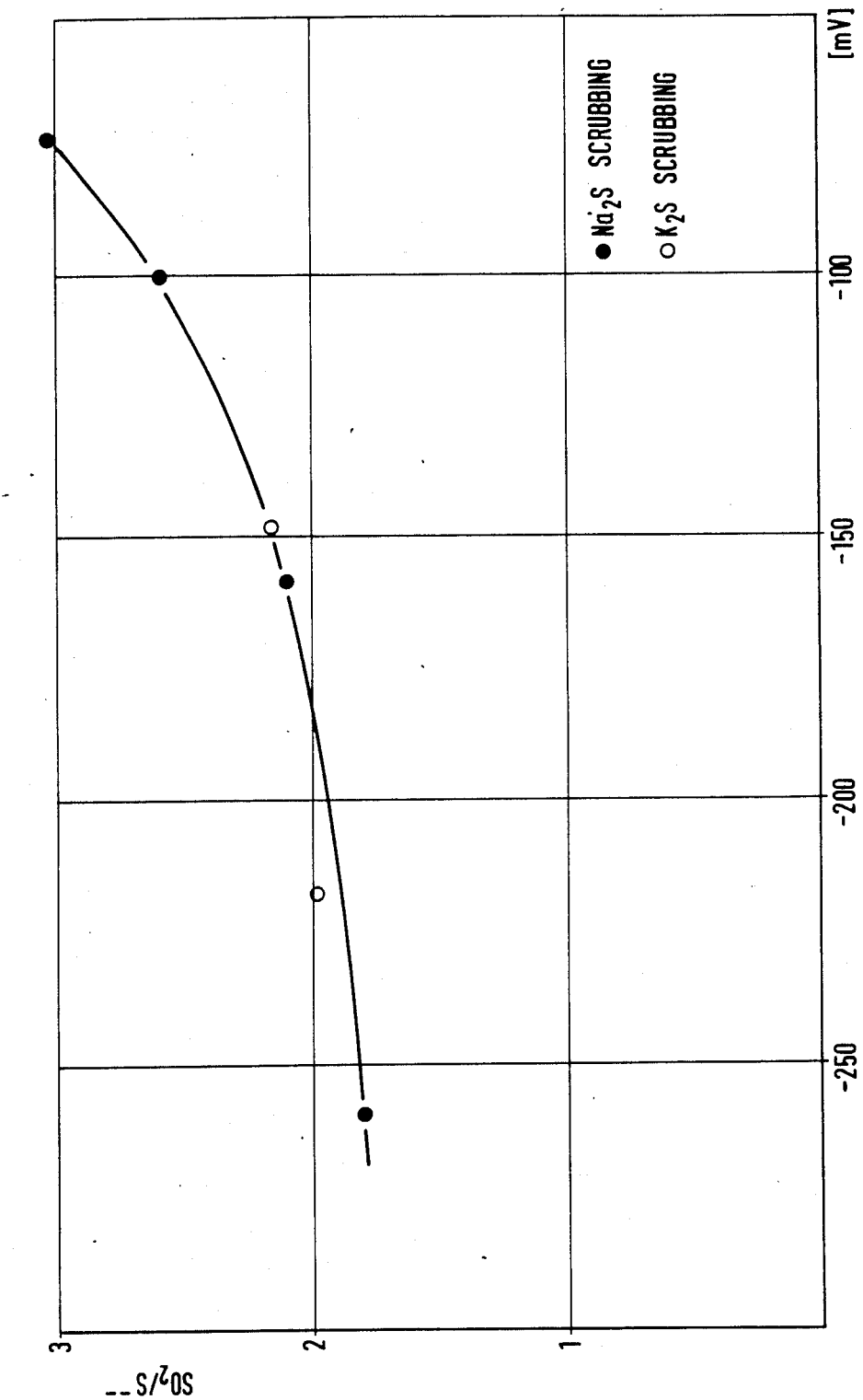
FIG. 4 illustrates the molar ration of sulphur dioxide and sodium sulphide as a function of the oxidation-reduction potential.

The experiment results show that the ratio of absorbed sulphur dioxide to the sulphide fed into the solution can be controlled by means of the oxidation-reduction potential of the solution. FIG. 4 illustrates the results from the scrubbing tests. The molar ratio between sulphur dioxide and sulphide is presented on the vertical axis of the coordinates, and the oxidation-reduction potential (mV) of the solution is presented on the horizontal azis.

The employed scrubbing solution containing products resulting from the reactions (2)–(6) is conveyed into an autoclave. There the solution temperature is raised above 120° C., in which case the reactions proceed until the final result according to the reaction (1). The created elemental sulphur is settled down on the bottom of the autoclave, wherefrom it can be discharged in molten state. The sulphate solution or suspension is discharged from the top the autoclave.

The regeneration method of the scrubbing solution depends on the employed sulphide. There are two different methods for separating a soluble sulphate from the solution coming out of the autoclave. The sulphate can be crystallized from the solution after a conventional fashion either by concentrating the solution by means of evaporation and thereafter by crystallizing the sulphate by means of cooling the solution, or by evaporating all of the liquid of the solution.

The sulphate separated by means of crystallization or evaporation is reduced by means of carbon, hydrocarbon, carbon monoxide, hydrogen or other reducing agent in a conventional fashion into sulphide which is employed, after the fashion described above, for adjusting the scrubbing capacity of the washing solution.

The solution coming out of the autoclave can also be regenerated by removing sulphate by means of barium or calcium sulphide, in which case the metal contained in the solution is associated with the sulphide. If the said sulphide is soluble, the solution can be employed, after separating the precipitated sulphate, for adjusting the scrubbing capacity of th scrubbing solution as described above. If the said sulphide is slightly soluble, the sulphide and sulphate must be separated in a known manner, for instance by means of flotation and/or a hydrocyclone, whereafter the sulphide can be employed in the above described fashion for adjusting the scrubbing capacity of the scrubbing solution.

The precipitated barium or calcium sulphate is reduced, after a known fashion, by means of carbon, hydrocarbon, carbon monoxide, hydrogen or other reducing agent in a kiln furnace or in a fluidized bed furnace into sulphide, which is re-employed for regenerating the solution coming out of the autoclave.

Figure 5:
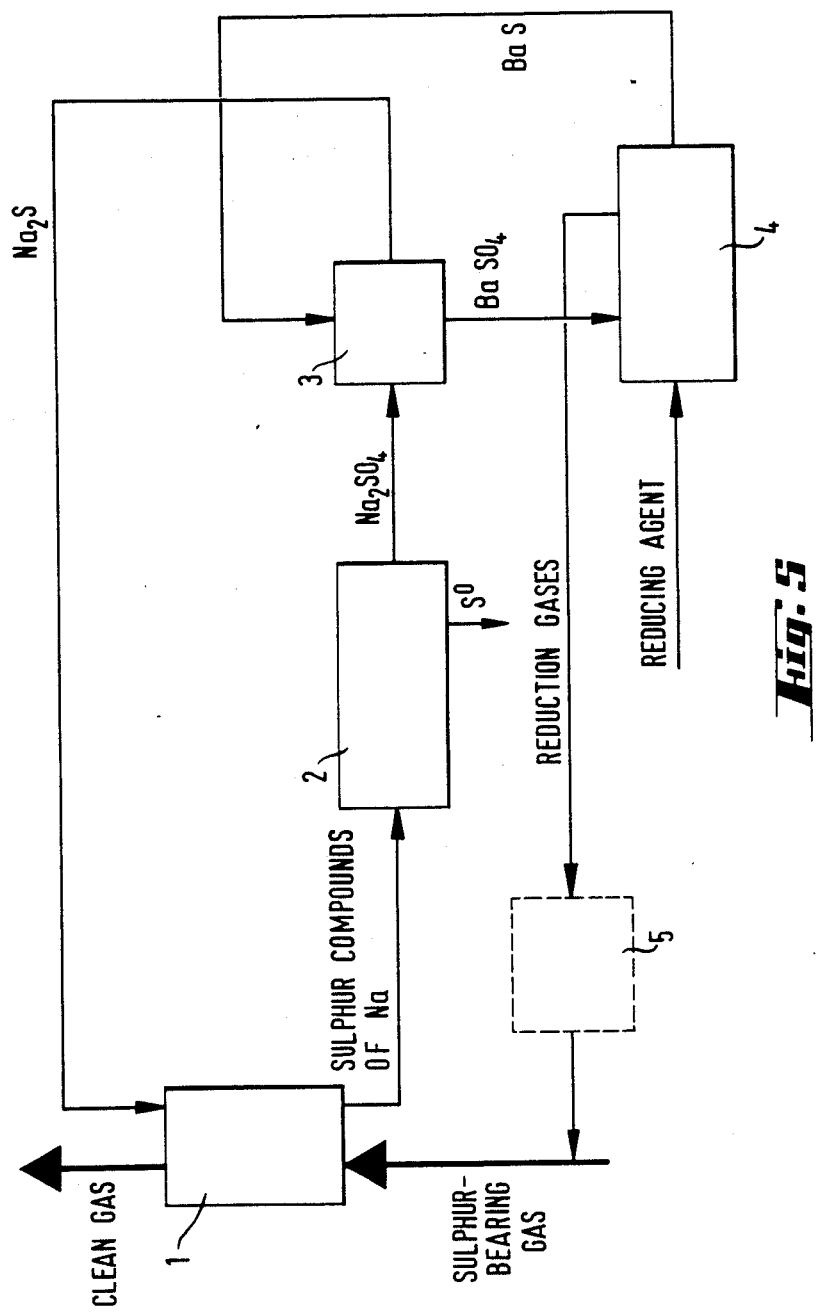
FIG. 5 is a flow diagram of a preferred embodiment of the invention.

A particularly advantageous method for performing the process is achieved by employing sodium sulphide for adjusting the scrubbing capacity of the scrubbing solution, and barium sulphide for regenerating the solution coming out of the autoclave. In this case the scrubbing chemical is completely soluble, and there is no danger of the scrubbing equipment's blocking due to the separation of solids nor of settling onto the bottom of the hold tank. Because the inside of the autoclave is also free of solids, nonreacted sulphide and precipitated sulphate, the elemental sulphur settled on the bottom of the autoclave is particularly pure. Instead of sodium sulphide, also potassium sulphide can be employed. FIG. 5 illustrates this preferred embodiment of the invention. The sulphur-bearing gases are conducted into the gas absorption stage 1, to which there is also conducted some water-soluble sulphide such as sodium or potassium sulphide. The gas absorption stage may comprise for instance one or two scrubber reactors, and the pH value or the oxidation-reduction potential of the scrubbing solution is adjusted so that from the last scrubber reactor with respect to the gas flow direction there is let out a gas which is clean of $SO_2$ and $H_2S$. The scrubbing solution containing sulphuric compounds of sodium (or potassium) is conducted into the autoclave 2, where the various sulphuric compounds are reacted at raised pressure and temperature so that the resulting product is partly elemental sulphur in molten state, and partly sodium sulphate solution. The $NA_2SO_4$ solution is conveyed into the regeneration stage 3, whereinto also barium sulphide is conveyed. The barium sulphide and the sodium sulphate react in a known fashion into sodium sulphide and barium sulphate. The sodium sulphide is led back into the absorption stage 1, and the barium sulphate is led into the reduction stage 4 where it is reduced into barium sulphide for instance by reaction with carbon or hydrocarbon. The reduction gases resulting from the reduction can be conducted into the afterburning 5 and further into the absorption stage 1 along with the sulphur-bearing gases.

The use of a completely soluble scrubbing chemical is advantageous also in the mechanical cleaning of gases. The efficiency of the dust removal equipment located before sulphur removal can be relatively modest. The remaining dust can be removed into the scrubbing solution and separated therefrom for instance by filtering before the formation of elemental sulphur has started.

Figure 6:
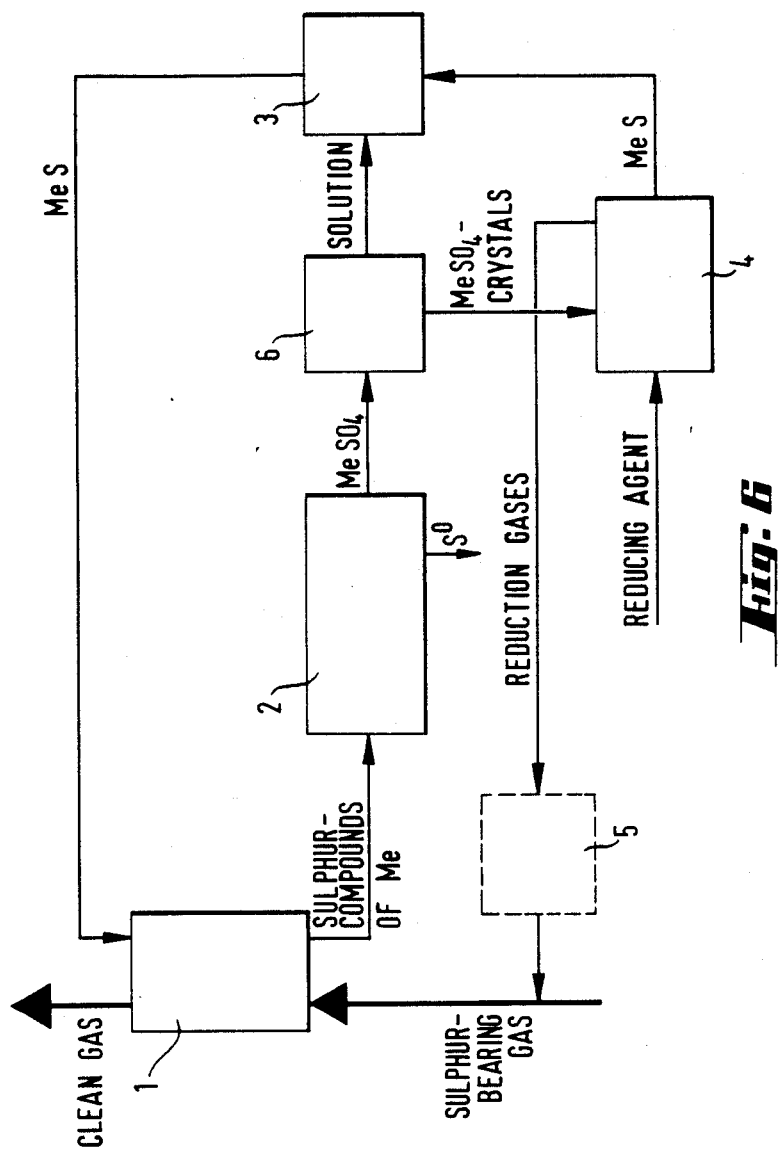
FIG. 6 is a flow diagram of another preferred embodiment of the invention.

FIG. 6 illustrates an embodiment where the employed sulphide is a low-solubility sulphide such as zinc sulphide, ferrosulphide or manganese sulphide. The process resembles that illustrated in FIG. 5, except that an aqueous suspension of sulphide is employed for adjusting the pH value of the oxidation-reduction potential of the scrubbing solution. If the sulphate resulting from the process is slightly soluble, the separation of sulphate crystals from the molten sulphur is carried out in the stage 6 before the regeneration stage 3.

The solubility of the sulphate created in the autoclave can be adjusted by means of the temperature. By choosing a sufficiently high temperature, the said sulphate is made to crystallize. The separation of elemental sulphur and sulphate crystals takes place already in the autoclave, as the sulphur settles down onto the bottom of the autoclave. The sulphate crystals are separated from the solution in the temperature and pressure existing within the autoclave, in order to prevent redissolution, for example by means of a hydrocyclone or a centrifuge. The recovered sulphate crystal mass is reduced immediately in the above described manners. This can be done by using an autoclave temperature between 150° C. and 300° C. in order to crystallize the metal sulphates, then separating the crystals formed before decreasing the temperature.

While employing the above mentioned sulphides for scrubbing gases, the regeneration of the solution coming out of the autoclave may naturally also be carried out in the previously described fashion, by employing barium or calcium sulphide. In that case, however, it is necessary to separate the metal sulphides used in the scrubbing from the barium or calcium sulphate.

Still, the reduction of zinc sulphate, ferrosulphate or manganese sulphate into sulphides is not as advantageous as the reduction of barium or calcium sulphates. Owing to the high partial pressure of sulphur dioxide in the said sulphates, part of the sulphate is broken down into oxide and sulphur dioxide instead of being reduced into sulphide. In the gas the sulphur dioxide reacts into sulphur and reduced sulphur compounds. In that case the reduction gases must be conducted into the gas scrubbing stage either directly or after oxidation.

When the scrubbing capacity of the scrubbing solution is adjusted by means of sulphide so that the sulphur dioxide is absorbed as completely as possible and that hydrogen sulphide is simultaneously released as scarcely as possible, in the scrubbing solution the molar ratio between the sulphur dioxide and the sulphide fed into the scrubbing is lower than the previously described ratio 2 which is optimal with respect to the autoclave treatment.

For example in the above described laboratory experiment, gas containing 20% sulphur dioxide was fed into the scrubber reactor. The scrubbing capacity of the sodium sulphide-based scrubbing solution was adjusted by means of sodium sulphide so that the solution pH value remained more or less in 3, and the oxidation-reduction potential measured with respect to a calomel electrode remained roughly in $-160$ mV. Now the gas coming out from the scrubbing contained about 0.6% sulphur dioxide and about 0.01% hydrogen sulphide. When the scrubbing capacity adjustments were changed so that the pH value remained around 4 and the redox potential remaied respectively around −260 mV, the sulphur dioxide content of the outcoming gas was about 0.2% and the content of hydrogen sulphide was about 1.5%. When the scrubbing capacity of the washing solution was further adjusted so that the solution pH remained roughly around 2.5 and the oxidation-reduction potential remained respectively around −100 mV, the sulphur dioxide content of the outgoing gas was about 7%, and the hydrogen sulphide content was below the analyzer's sensitivity limit 0.01%. The respective molar ratios between the absorbed sulphur dioxide and the infed sulphide in the three above described stages were 1.0, 0.7 and 1.6.

A corresponding experiment was carried out with a manganese sulphide-based scrubbing solution in two successive experiment stages. An aqueous suspension of manganese sulphide was fed into the scrubbing solution so that the pH value remained rougly at 3 and 2.5, and that the oxidation-reduction potential remained at −100 mV and −80 mV respectively. The sulphur dioxide content of the gas conducted into the scrubber reactor was about 11%, and the sulphur dioxide contents of the outgoing gas were 0.05% and 3.3% respectively, and the hydrogen sulphide contents were 0.03% and below 0.01% respectively. The molar ratios between the absorbed sulphur dioxide and hydrogen sulphide were 1.75 and 2.2 respectively.

The interdependent relationships between the pH value or the oxidation-reduction potential of the scrubbing solution, the sulphur dioxide and hydrogen sulphide contents of the outgoing gases, and the sulphur dioxide absorbed into the solution and the sulphide fed into the solution—these are also affected by the substance transfer efficiency in the gas absorption stage and the kinetic phenomena in the internal reactions of the solution.

On the basis of the above described experiment results it is obvious that a sufficiently complete sulphur dioxide absorption and the ideal molar ratio about 2 between the sulphur dioxide and the sulphide required by the autoclave treatment cannot be achieved simultaneously at the same stage. However, both of these aims can be achieved by performing the absorption in two or more stages, in which case the scrubber reactors can be switched either on a countercurrent principle or on a cocurrent principle. The ratio between the molar flows of sulphur dioxide and sulphide is profitably adjusted on the basis of the pH value or the oxidation-reduction potential of the last reactor in the solution flow direction, directly by means of a fresh sulphide supply. Simultaneously the pH of the last reactor in the gas flow direction is adjusted between 3-5 or the oxidation-reduction potention between −100−−260 mV by means of the sulphide fed into the said reactor in order to produce clean gas.

Figure 7:
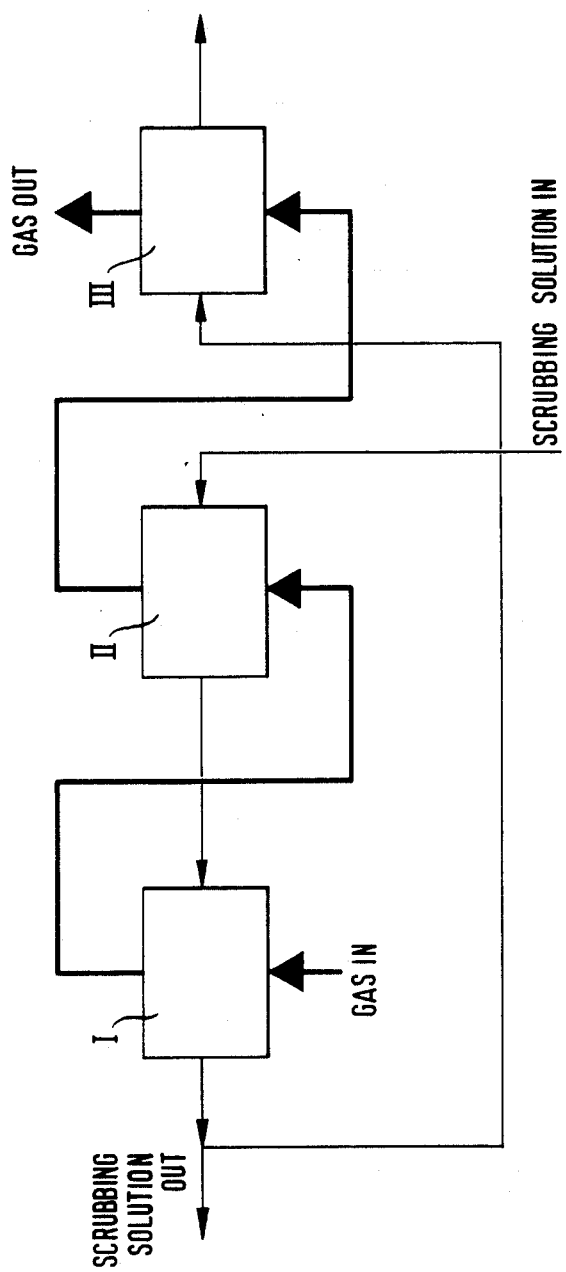
FIG. 7 is a flow diagram of an embodiment of the invention, where the gas scrubbing is carried out in three stages.
Figure 8:
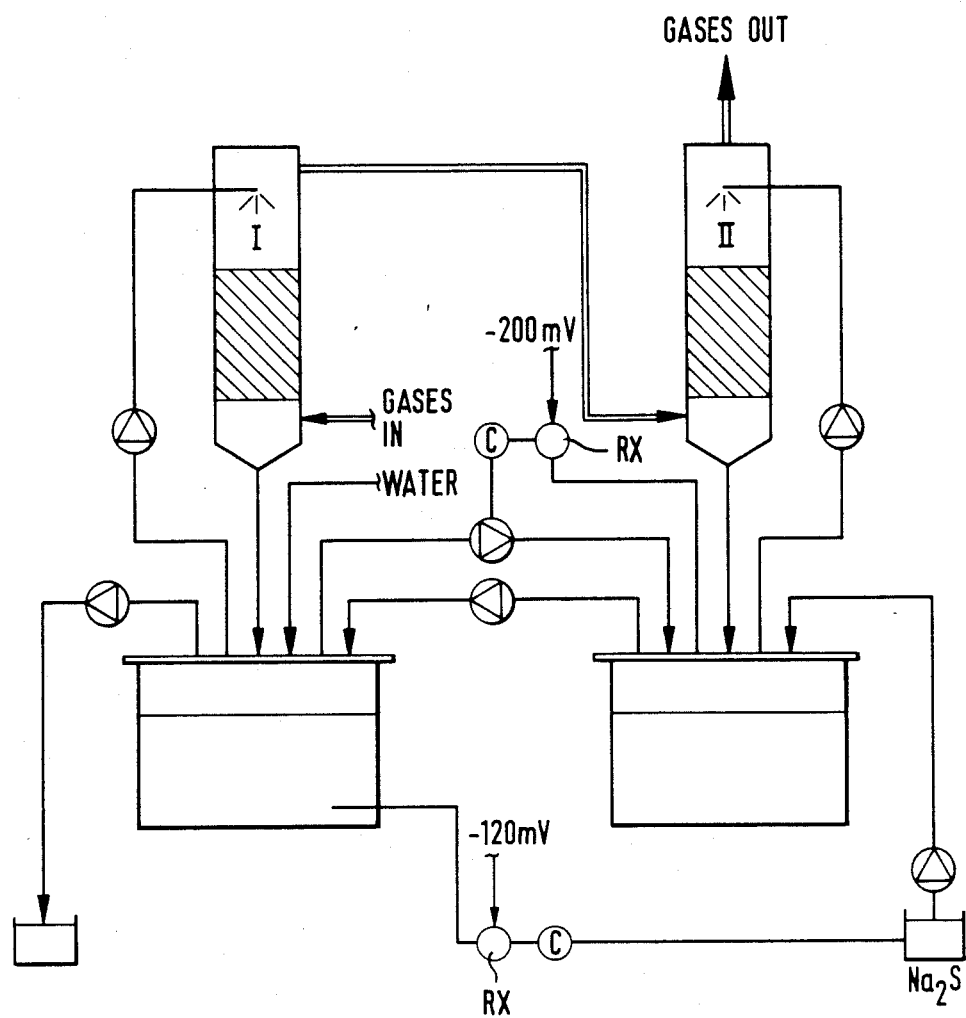
FIG. 8 illustrates an experimental apparatus according to example 6 and is described in more detail in connection with the said example.

In a preferred method of the process, the flow diagram whereof is illustrated in FIG. 7, the sulphur dioxide-bearing gas is conducted through the scrubber reactors 1-111. The fresh scrubbing solution is led into the scrubber reactor 11 and therefrom further into the reactor 1. In the scrubber reactor 11, the pH value of the oxidation-reduction potential of the solution is adjusted as described above in order to remove the sulphur dioxide effectively so that the pH value is between 3-5 or the oxidation-reduction potential is between −100−−260 mV. Any slight amount of hydrogen sulphide which is possibly released in the reactor 11, is removed in the reactor 111 by conducting some solution from the reactor 1 thereinto along with the said gas. The pH value of the reactor 1 or reactor 111 is adjusted between 2.5 to 3.5, or the oxidation-reduction potential between −70−−150 mV in order to adjust the molar ratio between the total amount of the absorbed sulphur dioxide and the infed sulphide within the range 1.8 to 2.2 required by the autoclave treatment by means of the sulphide flow fed into the reactor 1.

The adjusting of the pH value or of the oxidation-reduction potential of the first reactor in the gas flow direction to the exactly correct value is generally carried out by feeding a direct, comparatively small sulphide supply into the first reactor but in some cases the adjusting can also be carried out by feeding the sulphide amount required in the fine adjustment for instance into the following reactor with respect to the flow direction.

This method is also profitably suited for removing nitric oxides on the basis of the low oxidation-reduction potential of the scrubbing solution.

In countercurrent scrubbing, the last reactor in the gas flow direction is operated with the highest pH value, i.e. the oxidation-reduction potential of the solution is there at lowest. On the basis of the above described laboratory experiments, it is known that in that case the amount of released hydrogen sulphide is at its largest. In order to remove the hydrogen sulphide from the gas, it may be necessary to treat the gases with a scrubbing solution received from some other reactor connected in the same series.

In laboratory conditions there was also carried out an experiment where into the sulphide solution there was conducted gas containing both sulphur dioxide and free oxygen. At the beginning, when the molar ratio between the sulphur dioxide absorbed into the solution and the sulphide contained in the solution was low, the oxygen was absorbed in the solution only slightly. Later, as the said molar ratio increased, a considerable part of the free oxygen mixed in the solution was absorbed.

The oxygen absorbed in the solution raises the oxidation-reduction potential by oxidizing sulphide. In order to maintain the solution's capacity to scrub sulphur dioxide, the influence of the oxygen must be compensated by feeding extra sulphide into the solution.

If the free oxygen contained in the gas cannot be adjusted to a sufficiently low level by controlling the process which produces the gases to be cleaned, a method more advantageous than the previous one is to add fuel into the gas in order to burn the free oxygen before the gas is conducted into the sulphur removing stage and while its temperature is still sufficiently high. This can be carried out in manners already known in the art.

In order to maintain the elemental sulphur possibly formed at the scrubbing stage as a sufficiently finely divided suspension and in order to prevent blocking, it is possible to add into the scrubbing solution agents which improve the moisturization of the sulphur surfaces, such agents being for instance natural tannines such as quebracho.

Because the sulphur is let out of the autoclave in molten state, the melting point of sulphur sets a limit to the lowest temperature in the autoclave, i.e. the temperature in the autoclave must be above about 120° C.

The higher the temperature in the autoclave, the quicker the products resulting from the side reactions (2)-(6) react in favor of the final result according to the reaction (1). Experiments have shown that already at a temperature of 130° C. over 90% of the products resulting from the reactions (2)–(6) are broken down in less than half an hour. An advantageous operation temperature for the autoclave is 130°–150° C.

It it is desired that the created sulphate is crystallized in the autoclave, the required temperature depends on the particular metal in the sulphate in question. The solubility of ferrosulphate starts to decrease roughly above 60° C. At a temperature of about 150° C., the major part of the solution sulphate can be separated by crystallizing ferrosulphate.

While crystallizing manganese sulphate, the required temperature in order to achieve a corresponding separation level is about 200° C.

The invention is further described by aid of the following examples:

EXAMPLE 1

Gas containing 20% sulphur dioxide and 80% nitrogen was first conducted at the speed of 1 l/min into a 2 l bubbler which was filled with water at the temperature of 60° C. The solution pH was adjusted with a $Na_2S$ solution ($Na_2S$ about 120 g/l) by aid of a titrator. The pH set value was changed during the experiment so that at first it was 3.0 (3.3 at 25° C.) and the oxidation-reduction potential was −150–160 mV measured with respect to a calomel electrode. In the course of the experiment, the pH set value was changed so that the pH was 4 (4.2 at 25° C.) and 2.5 (2.3 at 25° C.) and the oxidation-reduction potential was about −260 mV and about −100 mV respectively. Each pH value was maintained for 10–12 hours. Conclusions of the results from the scrubbing experiments are illustrated in Table 1.

TABLE 1

| Time h | pH 60° C. | pH 25° C. | Ox. red. pot. mV | $Na_2S$* ml | Gas | | | | Solution | | |
|---|---|---|---|---|---|---|---|---|---|---|---|
| | | | | | $SO_2$ | $H_2S$ ml | $N_2$ | $Ar + O_2$ | $S_{tot}$ g/l | $SO_4$ | $S_2O_3$ |
| 0 | | 7.6 | 0 | | 18.94 | | 81.05 | 0.01 | | | |
| 2 | 3.0 | 3.14 | −160 | 480 | 0.60 | 0.01 | 99.15 | 0.09 | 17.0 | 26.2 | 1.5 | 3.5 |
| 4 | 3.0 | 3.17 | −165 | 900 | 0.58 | 0.01 | 99.31 | 0.03 | 26.7 | 41.7 | 2.6 | 56 |
| 6 | 3.0 | 3.30 | −160 | 1290 | 0.60 | 0.01 | 99.18 | 0.17 | 37.1 | 57.5 | 4.6 | 74 |
| 8 | 3.0 | 3.37 | −155 | 1650 | 0.51 | — | 99.14 | 0.25 | 44.4 | 67.9 | 7.2 | 84 |
| 10 | 3.0 | 3.50 | −150 | 2020 | 0.55 | — | 99.80 | 0.59 | 50.4 | 69.9 | 10.3 | 88 |
| 12 | 3.0 | 3.42 | −15.5 | 2380 | 0.39 | — | 97.90 | 1.65 | 52.3 | 76.4 | 12.8 | 94 |
| 14 | 4.0 | 4.21 | −260 | 3160 | 0.25 | 1.38 | 96.84 | 1.45 | 60.2 | 80.6 | 4.8 | 138 |
| 16 | 4.0 | 4.2 | −255 | 3680 | 0.27 | 1.22 | 97.04 | 1.40 | 62.5 | 82.1 | 3.9 | 145 |
| 18 | 4.0 | 4.2 | −260 | 4220 | 0.19 | 1.63 | 97.95 | 0.19 | 64.7 | 79.9 | 3.0 | 141 |
| 20 | 4.0 | 4.2 | −260 | 4660 | 0.20 | 1.84 | | 0.09 | 65.9 | 77.9 | 2.6 | 147 |
| 22 | 4.0 | 4.2 | −230 | 5200 | 0.21 | 0.29 | | 0.07 | 67.3 | 95.9 | 2.2 | 150 |
| 24 | 3.3 | 2.7 | −150 | 5200 | 0.54 | — | | 0.11 | 65.5 | 105 | 25 | 80 |
| 26 | 2.8 | 2.6 | −1.25 | 5200 | 1.75 | — | | 0.12 | 67 | 128 | 28 | 40 |
| 28 | 2.5 | 2.3 | −100 | 5200 | 6.50 | — | | 0.05 | 67 | 130 | 51 | 16.5 |
| 30 | 2.5 | 2.3 | −95 | 5280 | 5.97 | — | | 0.08 | 67 | 124 | 58 | 15.5 |
| 32 | 2.5 | 2.4 | −105 | 5680 | 7.45 | — | | 0.12 | 68 | 122 | 65.5 | 15.5 |

*Accumulative consumption of the $Na_2S$ solution

A 2 l overflow resulting from the above described experiment with the pH value 3 (0–12 h) was as such disposed into an autoclave at the temperature of 150° C. for the duration of one hour. The created elemental sulphur (35.6 g) was separated from the solution by filtering. The composition of the solution before and after the autoclave treatment is illustrated in Table 2.

| | Na | $S_{tot}$ | $SO_4$ g/l | $S_2O_3$ | $S_4O_6$ | pH |
|---|---|---|---|---|---|---|
| Before | 34 | 50.6 | 7.8 | 69 | 14.9 | 3.7 |
| After | 33.5 | 34.1 | 40 | 34 | 8.5 | 4.4 |

EXAMPLE 2

In another experiment, the pH was adjusted with a calcium sulphide slurry (ca 115 g/l, S 127 g/l) which was produced by conducting hydrogen sulphide into a calcium hydroxide slutty (CaO 250 g/l) until the pH was about 8; otherwise the conditions were similar as in Example 1. The results from the scrubbing experiment are illustrated in Table 3.

TABLE 3

| Time h | pH 60° C. | pH 25° C. | Ox. red. pot. mV | CaS con. ml | Gas | | | | | Solution | | |
|---|---|---|---|---|---|---|---|---|---|---|---|---|
| | | | | | $SO_2$ | $H_2S$ | $N_2$ % | $Ar + O_2$ | Ca | $S_{tot}$ g/l | $SO_4$ | $S_3O_3$ |
| 0 | 7.0 | | +15 | 0 | 18.99 | — | 80.99 | 0.02 | | | | |
| 2 | 3.0 | 2.7 | −113 | 170 | 0.91 | 0.04 | 99.03 | 0.02 | 10.5 | 20.0 | 0.9 | 205 |
| 4 | 3.0 | | −1.10 | 370 | 0.95 | 0.02 | 98.90 | 0.13 | 21 | 36.8 | 2.7 | 40 |
| 6 | 3.0 | | −1.17 | 530 | 1.04 | 0.01 | 98.92 | 0.03 | 30 | 53.4 | 3.2 | 64 |
| 8 | 3.0 | | −118 | 730 | 0.69 | 0.02 | 99.21 | 0.08 | 37.5 | 65.1 | 3.0 | 80 |
| 10 | 3.0 | | −123 | 950 | 0.27 | 0.03 | 99.64 | 0.06 | 50 | 78.5 | 3.1 | 105 |
| 12 | 3.0 | 2.7 | −124 | 1170 | 1.29 | 0.08 | 98.62 | 0.01 | 55 | 90.2 | 2.2 | 117 |
| 14 | 4.0 | 4.5 | −227 | 1550 | 0.01 | 3.81 | 96.15 | 0.03 | 50 | 76.2 | 2.0 | 131 |
| 16 | 4.0 | 4.0 | 4.0 −227 | 1550 | 0.03 | | | | 55 | 87.8 | 1.8 | 153 |
| 18 | 4.0 | 4.1 | −218 | 2000 | 0.01 | 4.57 | 95.41 | 0.01 | 63 | 101 | 1.9 | 173 |

EXAMPLE 3

3.5 mol $FeSO_4.7H_2O$ was dissolved into water. The FeS was precipitated by adding 4 mol $Na_2S$. The precipitate was filtered and washed thoroughly with special care to avoid oxidation. The FeS precipitate was elutriated into clean water to form 2.5 liters in a 3 l bubbler, whereto was subsequently conducted a gas compound at the speed of 1 l/min (0.1 l/m sulphur dioxide and 0.9 l/min nitrogen) at the temperature of 60° C. Conclusions of the results from the batch scrubbing experiment are illustrated in Table 4.

TABLE 4

| Time h | pH 60°0 C. | Ox. red. pot. MV | SO$_2$ | H$_2$S | N$_2$ % | Ar + O$_2$ | CO$_2$ | Fe | S$_{tot}$ | SO$_4$ g/l | S$_2$O$_3$ |
|---|---|---|---|---|---|---|---|---|---|---|---|
| 0 | 6.0 | −675 | 10.83 | — | 89.06 | 0.03 | 0.10 | | | | |
| 2 | 5.4 | −325 | 0.17 | 0.11 | 99.63 | 0.03 | 0.08 | | | | |
| 4 | 4.7 | −266 | 0.03 | 0.04 | 99.85 | 0.02 | 0.07 | | | | |
| 6 | 3.7 | −163 | 0.05 | 0.07 | 99.81 | 0.03 | 0.07 | | | | |
| 8 | 3.4 | −129 | 0.13 | 0.01 | 99.79 | 0.02 | 0.07 | | | | |
| 10 | 3.2 | −114 | 0.30 | 0.01 | 99.61 | 0.04 | 0.06 | | | | |
| 12 | 3.1 | −106 | 0.41 | 0.02 | 99.48 | 0.04 | 0.08 | 42.0 | 56.9 | 17.5 | 72.1 |

EXAMPLE 4

The scrubbing solution produced in the fashion described in Example 3, which solution was received from a corresponding Na$_2$S scrubbing, was treated in the autoclave at the termperature of 200° C. for the duration of one hour. The results are apparent from Table 5.

| | Vol. ml | Na | S$_{tot}$ | SO$_4$ | S$_2$O$_3$ g/l |
|---|---|---|---|---|---|
| Starting solution | 1430 | 144 | 267 | 49 | 107 |
| 30 min | | 146 | 131 | 410 | <0.05 |
| 60 min | 1060 | 145 | 131 | 405 | <0.05 |

The amount of created elemental sulphur was 189 g.

EXAMPLE 5

The apparatus and method according to Example 1 was employed to adjust the pH with a manganese sulphide slurry (5 mol MnS/2 l water) which was prepared by precipitating manganese sulphate solution with hydrogen sulphide; the decisive difference in the experiment was that the speed of SO$_2$ was 100 ml/min and the speed of N$_2$ was 900 ml/min.

The results from the scrubbing experiment are presented in Table 6.

2 l of the solution from the previous scrubbing experiment with a pH within the range of about 3 was put into the autoclave at the temperature of 150° C. for the duration of one hour, and the created elemental sulphur, 41.9 g, was separated from the solution by filtering. The composition of the solution before and after the autoclave treatment is illustrated in Table 7.

TABLE 7

| | Mn | S$_{tot}$ | SO$_4$ | S$_2$O$_3$ | S$_4$O$_6$ |
|---|---|---|---|---|---|
| Before | 41 | 47.8 | 31 | 39 | 21.2 |
| After | 44 | 29.3 | 70 | 7.9 | 5.3 |

EXAMPLE 6

The continuous-acting gas scrubbing experiment apparatus was formed of two filler columns with a diameter of 85 mm; the height of the filler part was 200 mm. Gas containing 8% sulphur dioxide, 8% carbon dioxide and the rest nitrogen, was conducted into the first scrubbing tower at the speed of 16.8 l/min. At the bottom part of the scrubbers there were located gas-sealed pump tanks, through which the scrubbing solution was circulated in the scrubbers at the speed of 5 l/min. The temperature of the washing solutions was 60° C. The fresh sodium sulphide solution was conducted into the pump tank of the last scrubber, the surface of which tank was maintained at a standard height by means of a pump which fed the solution into the pump tank of the first column. The supply of the sodium sulphide solution into the pump tank of the last column was controlled by the oxidation-reduction potential of the pump tank of the first column and this oxidation-reduction potential was adjusted within the range −120 ... −150 mV. Return pumping was arranged from the pump tank of the first column into the pump tank of the last column. The operation of the pump was controlled by the

TABLE 6

| Time h | pH 60° C. | pH 25° C. | Ox. red. pot. mV | MnS con.* ml | Gas SO$_2$ | H$_2$S | N$_2$ | Ar + O$_2$ | Mn | Solution S$_{tot}$ | SO$_4$ g/l | S$_2$O$_3$ |
|---|---|---|---|---|---|---|---|---|---|---|---|---|
| 0 | | | | | 10.96 | — | 88.97 | 0.07 | | | | |
| 2 | 3.0 | | −110 | 160 | 0.03 | 0.05 | 99.22 | 0.70 | 7.8 | 13.2 | 1.1 | 7.7 |
| 4 | 3.0 | | −105 | 320 | 0.06 | 0.04 | 99.62 | 0.28 | 13.2 | 23.0 | 2.3 | 11.5 |
| 6 | 3.0 | | −100 | 500 | 0.03 | 0.03 | 99.50 | 0.43 | 19.3 | 32.8 | 4.4 | 16 |
| 8 | 3.0 | | −100 | 620 | 0.06 | 0.02 | 99.68 | 0.24 | 25.5 | 40.8 | 7.4 | 20 |
| 10 | 3.1 | | −100 | 790 | 0.10 | 0.02 | 99.75 | 0.03 | 31.0 | 47.2 | 12.0 | 24 |
| 12 | 3.0 | | −100 | 900 | 0.10 | — | 99.65 | 0.03 | 36.0 | 53.1 | 14.5 | 25 |
| 14 | 2.5 | 2.0 | −85 | 960 | 3.45 | — | 96.40 | 0.16 | 36.0 | 52.5 | 21.5 | 13 |
| 16 | 2.5 | 2.1 | −75 | 1020 | 3.37 | — | 96.44 | 0.20 | 38.0 | 55.0 | 25.5 | 11.5 |
| 20 | 2.5 | 2.1 | −75 | 1100 | 2.96 | — | 96.41 | 0.03 | 41.0 | 56.3 | 31.5 | 9.5 |
| 22 | 3.5 | | −120 | 1660 | 1.05 | — | 97.22 | 1.74 | 55 | 62.2 | 28.5 | 56 |
| 24 | 3.5 | 2.9 | −125 | 1940 | 0.91 | 0.01 | 98.70 | 0.37 | 60 | 68.8 | 29 | 71 |
| 26 | 3.6 | | −120 | 2180 | 0.90 | 0.03 | 97.55 | 1.52 | 66 | 74.4 | 30 | 80 |
| 28 | 3.8 | 3.2 | −145 | 2430 | 0.72 | 0.05 | 98.43 | 0.80 | 68 | 74.0 | 29 | 89 |
| 30 | 3.7 | | −140 | 2640 | 0.60 | 0.02 | 98.92 | 0.46 | 68 | 75.4 | 27.5 | 88 |
| 32 | 3.6 | | −130 | 2860 | 0.34 | 0.03 | 99.62 | 0.02 | 70 | 79.5 | 29.5 | 91 |

*Accumulative consumption of the MnS-slurry (5 mol/2 l water).

oxidatin-reduction potential of the last column, which potential was adjusted within the range −200 ... −230 mV. The spent solution was discharged from the pump tank of the first column. In order to replace the evaporated substance, water was added into the pump tank of the last column. The experiment arrangements are illustrated in the drawing.

The average results from the experiment are presented in Table 8.

TABLE 8

| | Column I | | | | Column II | | | |
|---|---|---|---|---|---|---|---|---|
| | solution | | gas | | solution | | gas | |
| stage | redox mV | pH | $SO_2$ % | $H_2S$ % | redox mV | pH | $SO_2$ % | $H_2S$ % |
| 1 | −150 | 3.1 | 4.1 | — | −200 | 3.9 | 0.32 | — |
| 2 | −120 | 3.0 | 3.5 | — | −230 | 4.3 | 0.04 | 0.02 |

The results from the experiment show how the oxidation-reduction potential affects the composition of the through going gas.

The average values of the solution analyses in the experiment are presented in Table 9.

TABLE 9

| | Column I | | | | Column II | | | | Supply | | | |
|---|---|---|---|---|---|---|---|---|---|---|---|---|
| stage | Na | $S_{tot}$ g/l | $SO_4$ | $S_2O_3$ | Na | $S_{tot}$ g/l | $SO_4$ | $S_2O_3$ | Na | $S_{tot}$ g/l | $SO_4$ | $S_2O_3$ |
| 1 | 80 | 125 | 49 | 88 | 66 | 97 | 4 | 158 | 108 | 48 | 3 | 7 |
| 2 | 90 | 128 | 93 | 72 | 74 | 109 | 6 | 174 | 106 | 59 | 2 | 6 |

EXAMPLE 7

The solution received from the column 1 according to the previous example, experiment stage 2 was immediately pumped into a 2 l continuous action autoclave lined with teflon, where the temperature was 150° C. and the pressure was 5 bar, at the speed of 2 l/h.

The average value analyses from a 24 h experiment are presented in Table 10.

TABLE 10

| | Na | $S_{tot}$ g/l | $SO_4$ | $S_2O_3$ |
|---|---|---|---|---|
| supply | 92 | 136 | 88 | 80 |
| discharge | 104 | 86 | 250 | 2.5 |

On the basis of the analysis results it is obvious that roughly 97% of the thiosulphate is broken down, when the concentration of the discharge solution is taken into account.

We claim:

1. A method for removing and recovering sulphur in elemental form from gases containing sulphur dioxide or sulphur dioxide and hydrogen sulphide, comprising absorbing the sulphur dioxide or sulphur dioxide and hydrogen sulphide contained in the gases into a metal sulphide-containing scrubbing solution, which solution contains sodium sulphide or potassium sulphide, by passing said gases in countercurrent flow to a flow of said sodium or potassium sulphide-containing scrubbing solution through two reactors, maintaining the pH of the first of said reactors between 2.5 and 3.5 or maintaining the oxidation-reduction potential in said first reactor between −70 and −150 mV with respect to a calomel electrode by feeding the sodium or potassium sulphide solution supply into said first reactor from the second reactor in order to adjust the molar ratio between the total sulphur dioxide absorbed in the solution and the sodium or potassium sulphide which is present in the solution to within the range of 1.8 to 2.2; treating the gases with the sodium or potassium sulfide solution in said first reactor to partially absorb a portion of the sulfur dioxide and hydrogen sulfide, conducting the treated gas from the first reactor to the second reactor wherein the gases are treated with fresh sodium or potassium sulphide solution and maintaining the pH of the scrubbing solution in said second reactor between 3 and 5 or maintaining the oxidation-reduction potential in said second reactor between −100 and −260 mV in order to yield a gas which is free of sulphur dioxide and hydrogen sulphide; conducting the resulting scrubbing solution from said first reactor having said molar ratio within the range of 1.8 to 2.2 into an autoclave and allowing the compounds, including hydrosulphide, hydrosulphite, thiosulphate, tetrathionate contained in the solution to react with each other at such a temperature and pressure as to produce molten elemental sulphur and a sodium or potassium sulphate solution and regenerating the sodium or potassium sulphate solution to obtain sodium or potassium sulphide and recycling the sodium or potassium sulphide to the second reactor.

2. The method of claim 1 wherein the temperature in the autoclave is between 120°-150° C.

3. The method of claim 1 wherein the temperature in the autoclave is between 150°-300° C. in order to crystallize metal sulphates, and including forming and separating crystals and then decreasing the temperature.

4. The method of claim 1 further comprising regenerating sodium or potassium sulphate created in the autoclave into sodium or potassium sulphide by reacting with barium sulphide or calcium sulphide, separating regenerated sodium or potassium sulphide from the barium or calcium sulphate and re-using the sodium or potassium sulphide for absorbing the gases and reducing barium or calcium sulphate back into barium or calcium sulphide by reacting with a carbonaceous agent.

* * * * *

UNITED STATES PATENT AND TRADEMARK OFFICE
CERTIFICATE OF CORRECTION

PATENT NO. : 4,937,057

DATED : June 26, 1990

INVENTOR(S) : Timo T. Talonen, et al

It is certified that error appears in the above-identified patent and that said Letters Patent is hereby corrected as shown below:

Col. 10, line 64, "about 120°C" should read: --i.e., about 120-150°C--.

Col. 12, Table 1, under column $SO_2$:

column beginning with "30", sixth column "5.97"

should read: --30  2.5  2.3  -95  5280  6.97--.

Column 13, Table 4, line 9:

second column "60°0C." should read --60°C--.

Signed and Sealed this

Twenty-second Day of October, 1991

*Attest:*

HARRY F. MANBECK, JR.

*Attesting Officer*      *Commissioner of Patents and Trademarks*